US006839396B2

(12) United States Patent
Willschuetz

(10) Patent No.: US 6,839,396 B2
(45) Date of Patent: Jan. 4, 2005

(54) CONTROL DEVICE FOR A COOLING CIRCUIT

(75) Inventor: Hans-Georg Willschuetz, Dresden (DE)

(73) Assignee: Forschungszentrum Rossendorf e.V., Dresden (DE)

( * ) Notice: Subject to any disclaimer, the term of this patent is extended or adjusted under 35 U.S.C. 154(b) by 0 days.

(21) Appl. No.: 10/332,215

(22) PCT Filed: Aug. 24, 2001

(86) PCT No.: PCT/DE01/03241

§ 371 (c)(1),
(2), (4) Date: Apr. 24, 2003

(87) PCT Pub. No.: WO02/17331

PCT Pub. Date: Feb. 28, 2002

(65) Prior Publication Data

US 2003/0169840 A1 Sep. 11, 2003

(30) Foreign Application Priority Data

Aug. 25, 2000 (DE) ........................................ 100 41 779

(51) Int. Cl.[7] ................................................ G21C 9/00
(52) U.S. Cl. ...................... 376/282; 376/285; 376/277; 376/293
(58) Field of Search ................................ 376/282, 285, 376/293

(56) References Cited

U.S. PATENT DOCUMENTS

| 3,379,613 | A | * | 4/1968 | Takashi et al. | ............. | 376/282 |
| 3,900,366 | A | * | 8/1975 | Sakaguchi | .................. | 376/250 |
| 4,274,920 | A | * | 6/1981 | Renko | ......................... | 376/264 |
| 4,696,791 | A | * | 9/1987 | Straub | ........................ | 376/299 |
| 4,836,443 | A | | 6/1989 | Wolters et al. | | |
| 5,080,857 | A | * | 1/1992 | Miller et al. | ................ | 376/280 |
| 5,343,506 | A | * | 8/1994 | Artnik et al. | ............... | 376/280 |

FOREIGN PATENT DOCUMENTS

| DE | 3719062 | 1/1988 | ................. 376/282 |
| DE | 197 02 568 | 9/1997 | |
| EP | 0419159 | 3/1991 | ................. 376/282 |

OTHER PUBLICATIONS

George et al. , "Britain's approach to the PWR stresses safety and relaibility," Nuclear Engineering International. Dec. 1982, pp. 34–42.*

Milioti et al., "Analsystical Studies of Elemental Iodine Removal by Sprays in the Donald C. Cook Nuclear Plant," Nulcear Technology, vol. 16, Dec. 1972, pp. 497–498.*

Jan. 21, 2003 Simulation of creep tests with French or German RPV–steel and investigation of a RPV–support against failure H.–G. Willschuetz et al. Annals of Nuclear Energy vol. 30 pp. 1033–1063.

May 4, 2003 Experimental Study on In–Vessel Corium Retention through External Vessel Cooling using Simulant Melt Kyoung–Ho Kang et al. Proceedings of ICAPP Paper 3067 pp. 1–8.

Dec. 1, 1999 AP600–a safe, simplified, economic plant H.J. Bruschi Nuclear Energy, 2000, 39 No. 3 pp. 163–166.

* cited by examiner

Primary Examiner—Michael J. Carone
Assistant Examiner—R Palabrica
(74) Attorney, Agent, or Firm—Jordan and Hamburg LLP

(57) ABSTRACT

Control device for a cooling circuit which enables a pressure tank of a reactor to be cooled even when a serious failure occurs, without having to resort to the use of external energy. One or more rods is disposed below a bottom cap of the reactor pressure tank. Each rod is connected to an emergency cooling system by a transmission system. The end of each rod opposite the transmission system is arranged at a distance of approximately 3 cm from the bottom cap. A hydraulic system is used advantageously as a transmission system. Each rod is placed vertically on a hydraulic cylinder arranged in a parallel position with respect to the axis of the reactor pressure tank, and each cylinder is connected to the emergency cooling system. When several hydraulic cylinders are used, they are connected to each other by hydraulic lines.

11 Claims, 2 Drawing Sheets

CONTROL DEVICE FOR A COOLING CIRCUIT

FIELD OF THE INVENTION

The invention relates to a control device for a cooling circuit. A preferred area of application of the invention is the emergency cooling of a reactor pressure vessel, especially for the vessel of a pressurized water reactor in the event of a core meltdown.

BACKGROUND OF THE INVENTION

An arrangement for cooling a nuclear power plant which automatically supplies the coolant depending on the pressure difference between the coolant and the reactor housing, is already known (DE 37 19 062 A1). A spurious release can be initiated with this technical solution.

It is also known that the temperature of the reactor pressure vessel may be measured and, when it exceeds a specified threshold, that the entry of water may be initiated by melting fusible plugs (A. Schaffrath, H. Ringel, Grundzuge passiver Sicherheitssysteme (Basic Principles of Passive Safety Systems) in: Neue Entwicklungen in der Kemergie zur Risikominimierung (New Developments in Minimizing the Risk of Nuclear Energy), Seminar VDI-GET & KTG, Dresden, May 11, 2000). This method of initiating the flow of coolant for controlling an incident is not suitable, at least not by itself.

OBJECTS AND SUMMARY OF THE INVENTION

It is an object of the invention to propose a control device for a cooling circuit, which is reliable and simple and ensures cooling of the reactor pressure vessel even in the event of a serious incident. At the same time, extraneous energy is not used.

Pursuant to the invention, the objective is accomplished by a control circuit for a reactor installation including a reactor pressure vessel having a bottom cap and an emergency cooling device including a cooling circuit for emergency cooling of the reactor pressure vessel upon occurrence of an event requiring cooling of the reactor pressure vessel. The control circuit includes at least one rod adapted to be arranged underneath the bottom cap such that an upper end of each rod is situated at a distance of about 3 cm from the bottom cap and a transfer system responsive to movement of the rod(s) indicative of the occurrence of the event requiring cooling of the reactor pressure vessel to cause the emergency cooling device to initiate cooling of the reactor pressure vessel upon movement of the rod(s), for example, by flooding the reactor pit.

The flooding of the reactor pit is a known measure for dissipating large amounts of heat which arise in the case of a nuclear core meltdown with the formation of a core melt lake in the bottom spherical cap of the reactor pressure vessel. It is a problem to ensure a passive initiation of the flooding of the outside of the reactor pressure vessel, which normally is dry, that is, surrounded by air or an inert gas. Passive means that externally controlled additional interventions in the plant or in mechanisms, based on extraneous energy, such as electrical circuits, sensors or motors, are not required.

On the basis of thermodynamics of a melt lake, the largest amount of heat enters the container wall in the upper region of the pool, which is named the focus region here. In view of the high temperatures in the focus region, the steel in this region has the least strength. At the same time, this wall region between the bottom spherical cap and the cylinder of the container must carry the entire weight of the bottom spherical cap and the melt.

Significantly greater loads are caused by internal pressures, which may exist and can also leads to the highest stresses in the upper region of the bottom spherical cap and in the lower region of the cylinder. In view of these conditions, the vessel commences to deform in the regions of high load and low strength. On the other hand, regions lower down and further up, and especially the center of the bottom spherical cap, have lower temperatures and, accordingly, higher to very high strength.

In the focus region, when there is internal pressure, the container wall will bulge outward. In every case, that is, also without the additional load of internal pressure, the wall, when subjected to an appropriate thermal stress, which is equivalent to a small residual wall thickness, will be stretched in the downward direction. The entire bottom spherical cap is therefore shifted vertically in the direction of gravity.

In the regular operation of the power plant or in incidents of a different type, such as earthquakes, the inventive device does not have a negative effect, that is, it will not bring about any losses in efficiency in normal operation or additional sources of danger in any other state of the plant. Spurious releases are also excluded. In addition, the device is not an impediment during inspection work or repair work and can be realized relatively inexpensively. The simply constructed, reliable and passively acting control device can make do without outside energy.

The invention is described in greater detail below by means of an example of a hydraulic system.

BRIEF DESCRIPTION OF THE DRAWINGS

In the associated drawings.

DETAILED DESCRIPTION OF THE INVENTION

Figure 1:
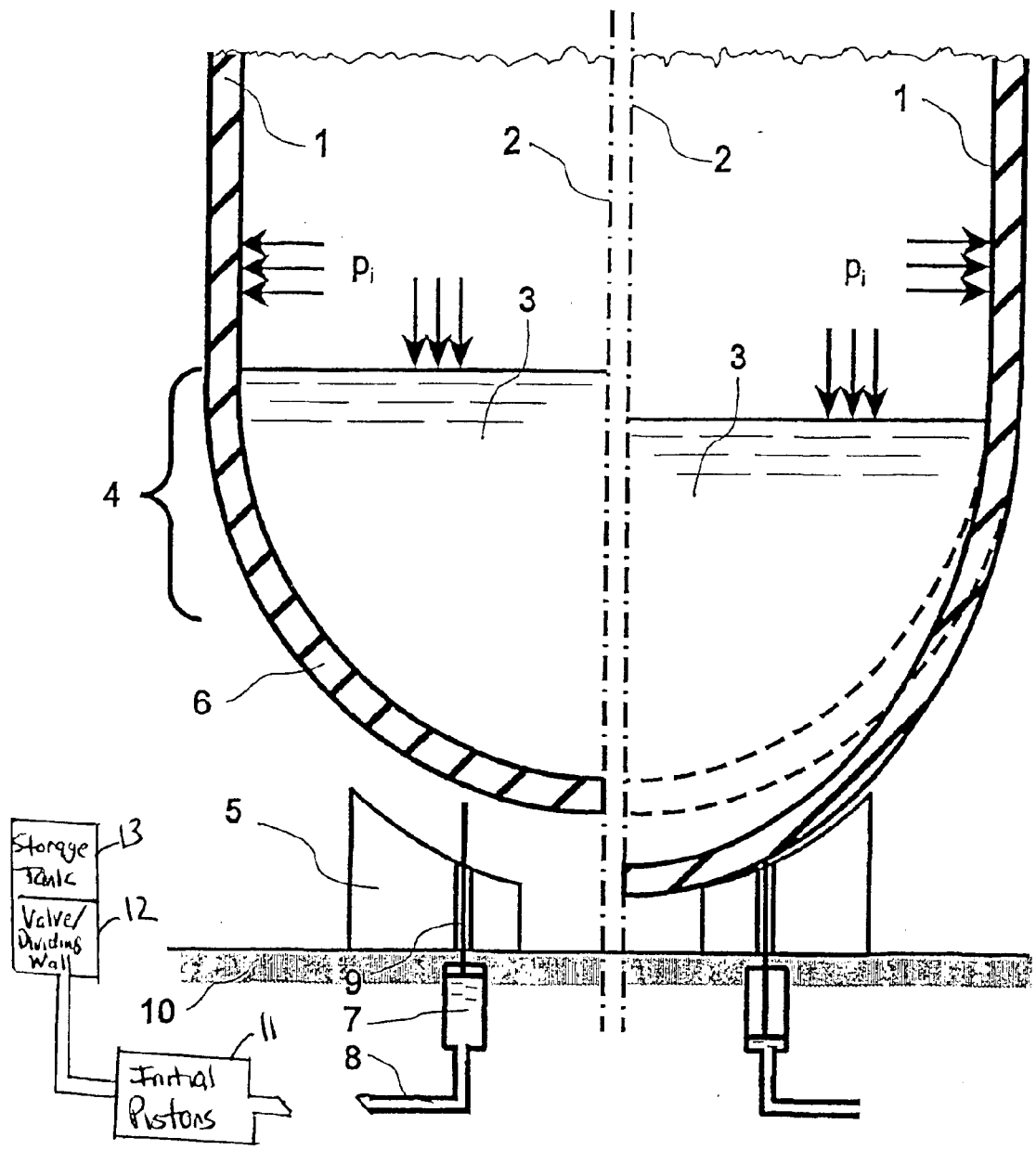
FIG. 1 shows the lower part of a steel vessel, which can be used as a reactor pressure vessel, in the left part in the starting state and, in the right part, with a bottom part, lowered by high temperature and/or pressure, in section.

In the left half of FIG. 1, a starting state of a reactor pressure vessel 1 is shown in the case of a nuclear meltdown. The line 2 of rotational symmetry separates the left from the right part. In the right half of the Figure, the reactor pressure vessel 1 is shown after a deformation, for example, after an excessive temperature and/or pressure.

In the representation, the reactor pressure vessel 1 is filled approximately up to the transition between the bottom spherical cap 6 and the cylindrical part of the reactor pressure vessel 1 with a core meltdown lake 3. The region 4 characterizes the anticipated focus region in the wall of the reactor pressure vessel 1. Below the bottom spherical cap 6, there are four supporting disks 5, which are disposed in a star-shaped arrangement and do not contact the reactor pressure vessel 1 during a regular operation.

Figure 2:
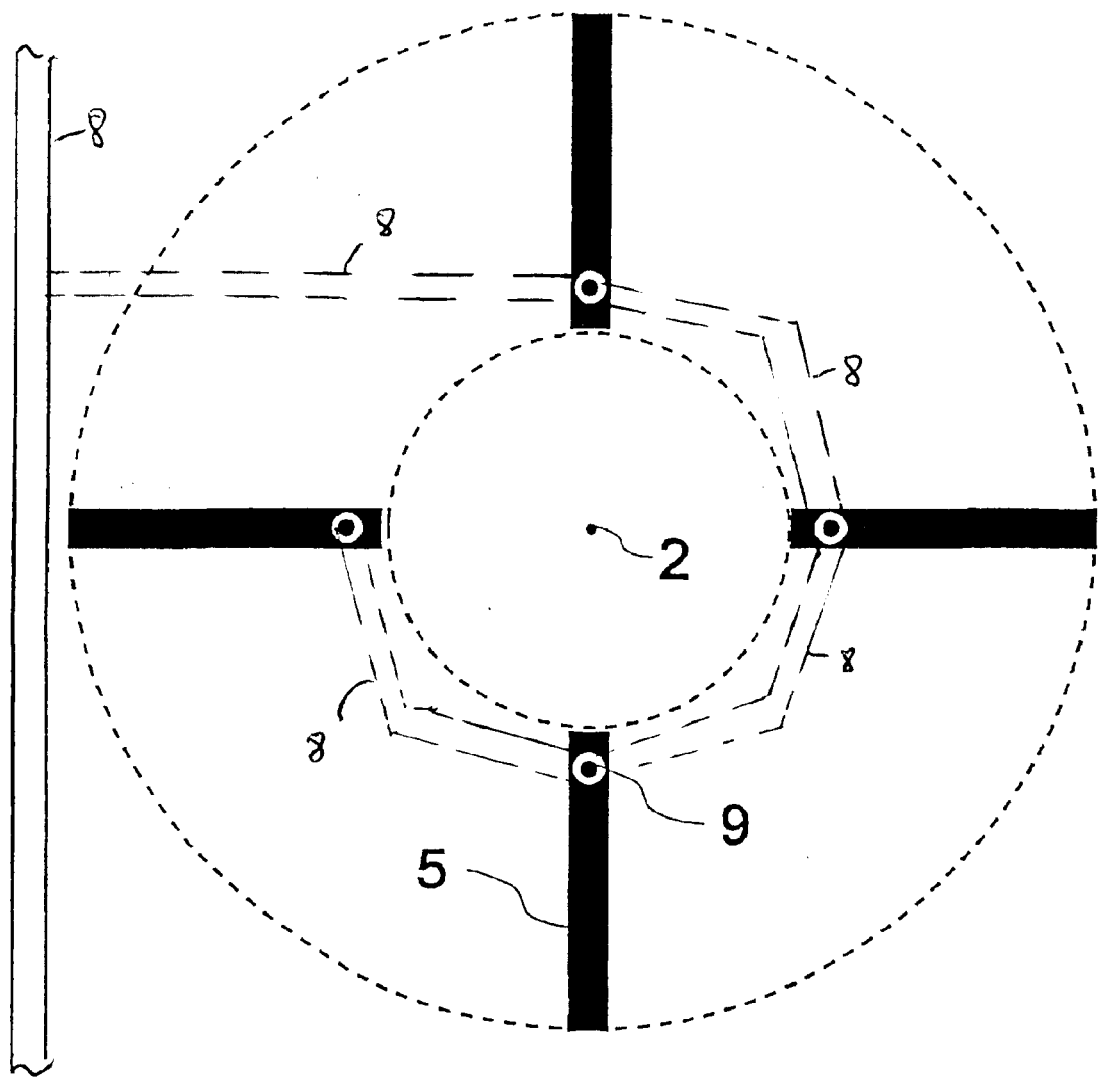
FIG. 2 shows the plan view of the parts mounted below the steel vessel.

To ensure advantageous flow relationships, the existing devices in the ground region of the reactor pressure vessel 1 are included in the arrangement of the inventive control device. Accordingly, in each supporting disk 5, a recess is provided, under each of which a hydraulic cylinder 7 is disposed, which is connected over a hydraulic pipeline 8 with the other hydraulic cylinders 7 (see FIG. 2). At the hydraulic piston of each hydraulic cylinder 7, a rod 9 is mounted, which protrudes through the recess of the supporting disk 5. The length of the rod 9 is such that its ends, i.e., those ends not attached to and extending from the hydraulic cylinder 7, are at the same distance of about 3 cm from the bottom spherical cap 6 of the reactor pressure vessel 1 in its control state. If the supporting disks 5, which are indicated here, are not present, the proposed control device can also be mounted at other components or constructed separately.

A hydraulic system, which operates according to the principle of communicating pipes, is a special embodiment. For example, if at several positions there is a hydraulic cylinder 7, the hydraulic piston of which, connected with a rod 9, is pushed in by the force of the vertically lowering bottom spherical cap 6, the desired passive system is available by way of the hydraulic pipelines 8. This system can be designed by defined piston paths, piston distances and piston cross-sectional areas so that the mechanisms, which are to be triggered, can be triggered only under the postulated conditions. For example, at least two pistons of the supporting arrangement must be pushed in, in order to extend one or more "initial pistons" 11, with which, for example, a dividing wall and/or a valve 12 to the "In-Containment Refueling Water Storage Tank" (IRWST) 13 is opened to cause flow of water from the storage tank 13 around the reactor pressure vessel 1, the initial pistons 11, dividing wall and/or valve 12 and IRWST 13 being shown schematically in FIG. 1.

By initiating the flooding only after two pistons of the supporting arrangement are pushed in, that is, upon contact of the bottom spherical cap 6 with at least two supporting disks 5, unintentional flooding, for example, by contact with a single supporting disk 5 during repair work, can be avoided.

What is claimed is:

1. A reactor installation, comprising:

a reactor pressure vessel having a bottom cap;

an emergency cooling device including a cooling circuit for emergency cooling of said reactor pressure vessel upon occurrence of an event requiring cooling of said reactor pressure vessel; and a control circuit for determining onset of an event requiring cooling of said reactor pressure vessel and directing said emergency cooling device to initiate cooling of said reactor pressure vessel, said control circuit comprising at least one rod each arranged underneath said bottom cap such that an upper end of said at least one rod is situated at a distance of about 3 cm from said bottom cap, and a transfer system responsive to movement of said at least one rod indicative of the occurrence of the event requiring cooling of said reactor pressure vessel to cause said emergency cooling device to initiate cooling of said reactor pressure vessel upon movement of said at least one rod.

2. The reactor installation of claim 1, further comprising at least one supporting disk arranged below said bottom cap and not in contact with said bottom cap during regular operation of said reactor pressure vessel, each of said at least one supporting disk including a recess through which a respective one of said at least one rod passes.

3. The reactor installation of claim 2, wherein said transfer system comprises at least one hydraulic cylinder each having a hydraulic piston, each of said at least one rod being mounted to said hydraulic piston of a respective one of said at least one hydraulic cylinder, said at least one hydraulic cylinder being arranged below said at least one supporting disk.

4. The reactor installation of claim 1, wherein said at least one rod comprises a plurality of rods, further comprising a plurality of supporting disks arranged below said bottom cap and not in contact with said bottom cap during regular operation of said reactor pressure vessel, each of said supporting disks including a recess through which a respective one of said rods passes.

5. The reactor installation of claim 1, wherein said at least one rod comprises four rods, further comprising four supporting disks arranged below said bottom cap in a star-shaped configuration and not in contact with said bottom cap during regular operation of said reactor pressure vessel, each of said supporting disks including a recess through which a respective one of said rods passes.

6. The reactor installation of claim 1, wherein said transfer system comprises a hydraulic system.

7. The reactor installation of claim 1, wherein said transfer system comprises at least one hydraulic cylinder each having a hydraulic piston, each of said at least one rod being mounted to said hydraulic piston of a respective one of said at least one hydraulic cylinder.

8. The reactor installation of claim 7, wherein said at least one rod is mounted perpendicular to said hydraulic piston of the respective one of said at least one hydraulic cylinder and each of said at least one hydraulic cylinder is arranged parallel to an axis of said reactor pressure vessel.

9. The reactor installation of claim 8, wherein said at least one hydraulic cylinder comprises a plurality of hydraulic cylinders, further comprising hydraulic pipelines connecting said hydraulic cylinders with one another.

10. The reactor installation of claim 8, further comprising a pit having a foundation, said reactor pressure vessel being arranged in said pit, said at least one hydraulic cylinder being arranged in said foundation.

11. The reactor installation of claim 1, wherein said bottom cap is spherical.

* * * * *